Dec. 10, 1963  J. R. ROSEN  3,113,905
APPARATUS FOR FORMING A PHONOGRAPH RECORD
Filed May 9, 1960  2 Sheets-Sheet 1
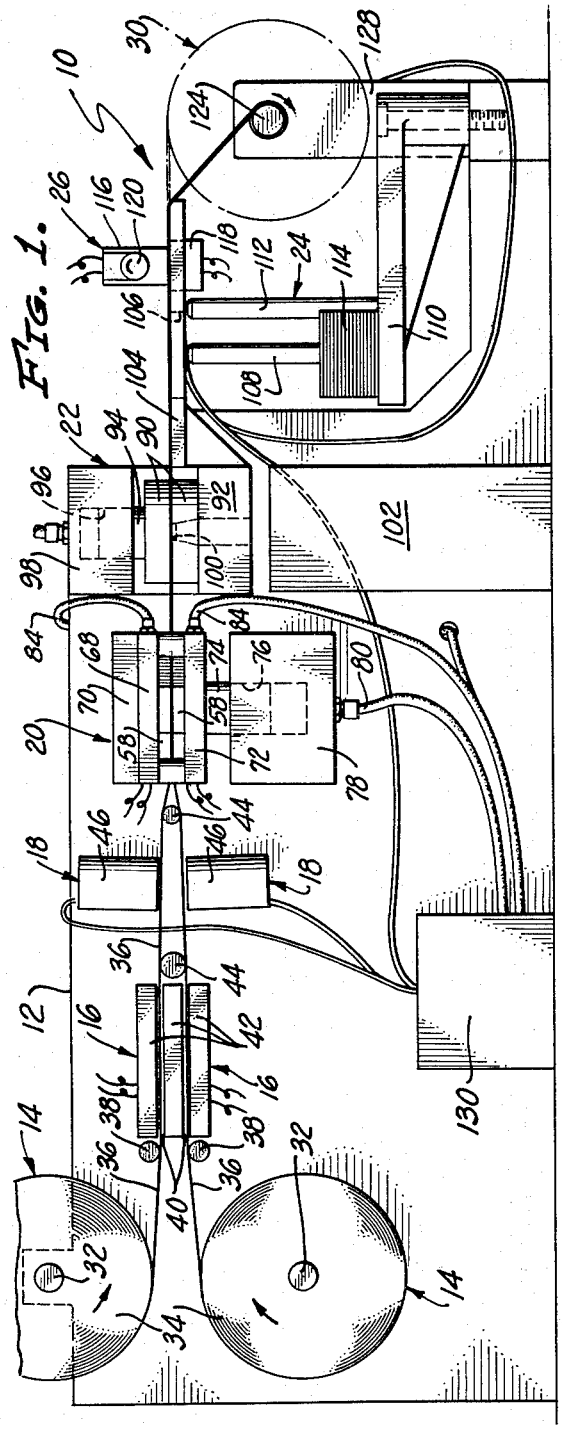
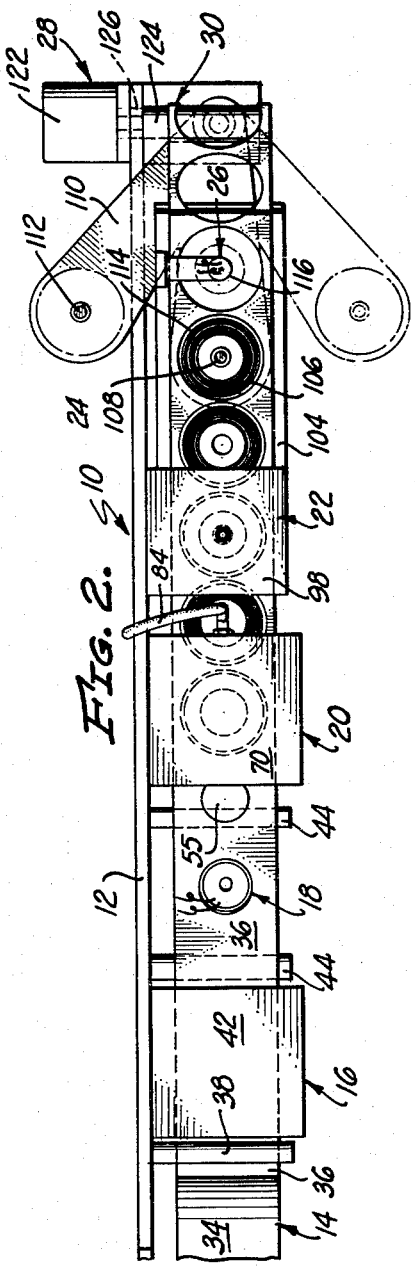
INVENTOR.
JACK ROSEN
BY
ATTORNEY Dec. 10, 1963    J. R. ROSEN    3,113,905
APPARATUS FOR FORMING A PHONOGRAPH RECORD
Filed May 9, 1960    2 Sheets-Sheet 2
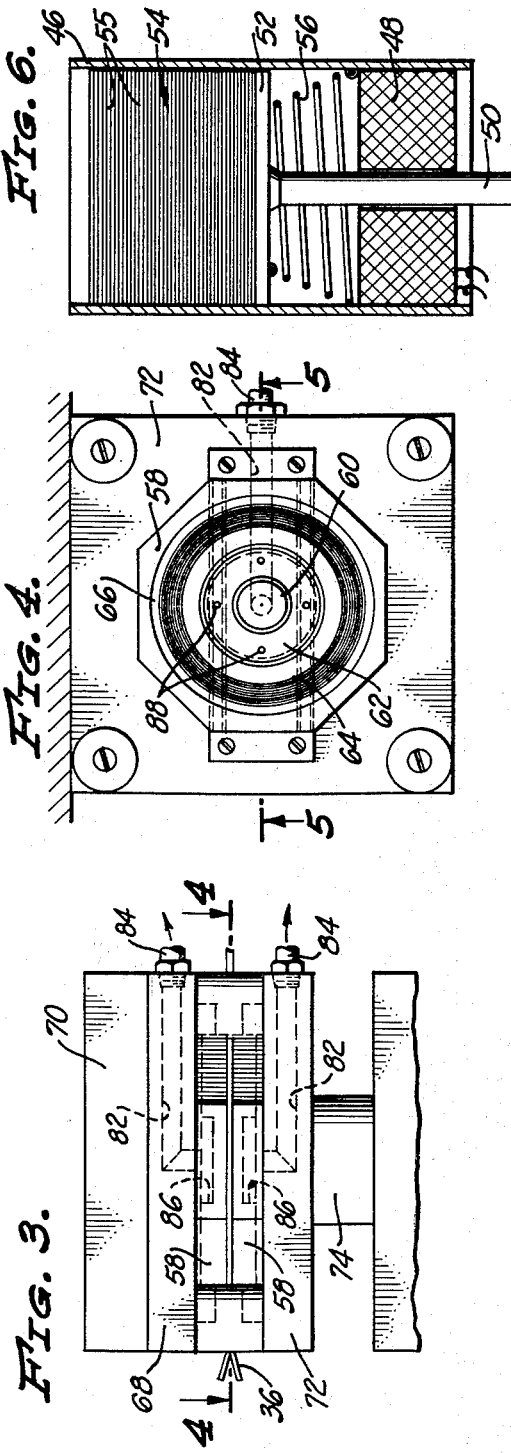
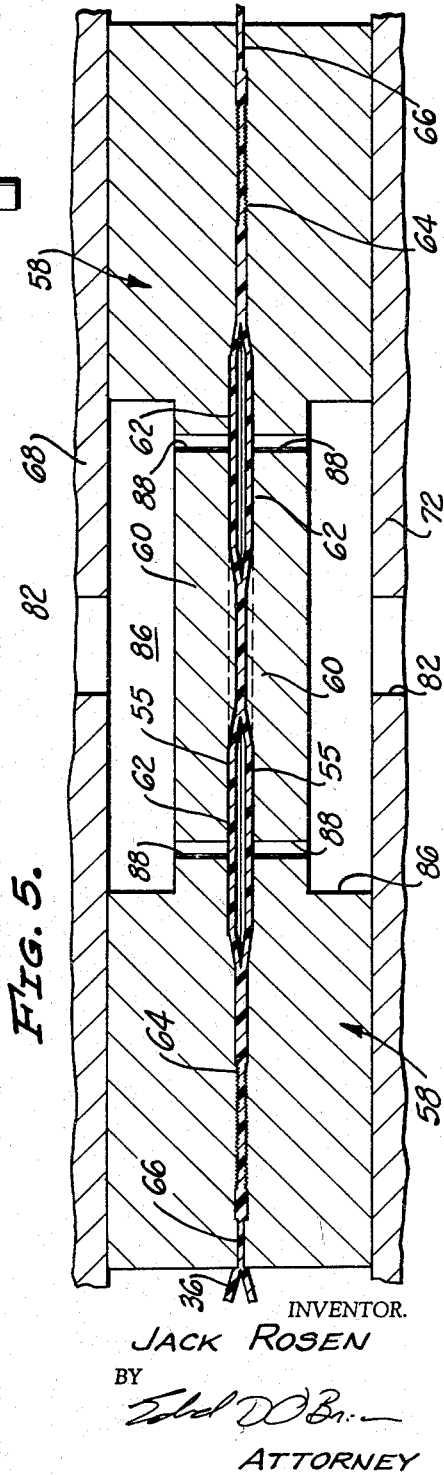
INVENTOR.
JACK ROSEN
BY
ATTORNEY 3,113,905
APPARATUS FOR FORMING A PHONOGRAPH RECORD
Jack R. Rosen, Los Angeles, Calif., assignor, by mesne assignments, to Automatic Record, Inc., Compton, Calif., a corporation of California
Filed May 9, 1960, Ser. No. 27,725
2 Claims. (Cl. 156—581)

This invention pertains to new and improved processes and apparatuses for forming articles out of sheets of thermoplastic materials.

In the past records and various other articles have normally been manufactured by processes involving the use of either conventional injection molding techniques or processes involving the use of various established compression molding procedures. Tremendous numbers of records have, of course, been produced by each of these general types of processes. However, both of these general types of procedures for forming records are of a limited character as far as commercial considerations are concerned because of certain basic costs. Primarily these costs involve the amount of labor which is required to manufacture a record or a similar article by either of these generalized procedures. Because of this there is a very definite need for some way of producing records or other articles at a lower cost than these products can be produced by conventional procedures as briefly indicated in this paragraph.

An object of the present invention is to fulfill this need. A further object of the present invention is to provide new and improved processes and apparatuses for forming articles such as records out of sheets of thermoplastic materials. A still further object of the present invention is to provide a process of this type which may be carried out comparatively easily and which enables records or various other articles to be produced at a comparatively low cost. Another object of this invention is to provide an apparatus of the type indicated which is relatively inexpensive to construct, which is extremely effective for the purpose intended, and which can be used to continuously produce records or various other articles at a comparatively nominal cost.

These and various other objects and advantages of this invention are set forth in other manners in the remainder of this description. They will also be apparent from a detailed consideration of this entire specification, including the appended claims, and the accompanying drawings in which:

FIG. 1 is a side elevational view of an apparatus of this invention;

FIG. 2 is a top plan view of this apparatus;

FIG. 3 is an enlarged side elevational view of a part of this apparatus;

FIG. 4 is a cross-sectional view taken at line 4—4 of FIG. 3;

FIG. 5 is a cross-sectional view taken at line 5—5 of FIG. 4; and

FIG. 6 is an enlarged vertical section view of a part of this apparatus.

In the drawings a presently preferred embodiment of an apparatus of this invention for carrying out a method as hereinafter explained has been set forth. It is contemplated that various changes of a routine engineering nature probably will be made in the precise apparatus shown in order to adapt this apparatus for use with various types of dies or other equipment of a known category. Because of the fact that such changes of a routine engineering character are possible in the apparatus illustrated, the accompanying drawings are not to be taken as limiting this invention in any respect.

As an aid to understanding this invention it can be stated in essentially summary form that it concerns the processing of sheets of thermoplastic materials so as to heat these sheets in means for this purpose, forming these sheets into a desired shape, such as the shape of a record, in means for this purpose, and separating from these sheets the articles so formed by the use of appropriate means for this last purpose. Various other steps as hereinafter explained are preferably used in carrying out the process of this invention and, of course, appropriate means for carrying such other steps are employed.

Because of the nature of this invention it is best more fully explained by referring directly to the accompanying drawings forming a part of this disclosure. Here there is shown a complete apparatus 10 including a frame-like support wall 12 which serves to hold means for holding rolls of sheets of thermoplastic material 14, surface heating means 16, label applying means 18, forming means 20, cutting means 22, collecting means 24, control means 26, power means 28 and means for forming a roll of scrap material 30. These various means contain various specific parts as hereinafter described which cooperate with one another during the operation of the complete apparatus 10 in order to form articles such as phonograph records.

In the apparatus 10 the means for holding rolls 14 consist of several axles 32 attached to the wall 12 so as to extend therefrom. During the use of the apparatus 10 these axles 32 preferably hold two rolls 34 of sheets of thermoplastic material so that individual sheets 36 may be supplied from each of these rolls to the various other means as indicated above during the use of the apparatus 10. These rolls 34 may be of known thermoplastic materials such as vinyl chloride, vinyl acetate, styrene, cellulose acetate, cellulose butyrate, various nylons or other similar polymers. If desired, these sheets may be plasticized in accordance with known techniques.

When the apparatus 10 is used the individual sheets 36 pass over guide and support rods 38 attached to the wall 12 so as to pass through slots 40 formed by spacing conventional platen-like flat heating elements 42 from one another. These elements 42 constitute the surface heating means 16 referred to above. These heating elements 42 may be attached to the wall 12 as shown, and may be formed so as to be electrically operated in accordance with known techniques. If desired, they may be of a radiant heating element type utilizing lamps; however, it is presently preferred to utilize thermostatically controlled resistance heating elements in the apparatus 10. Also if desired, the center-most of the elements 42 may be omitted in practicing the present invention, although this is not presently preferred inasmuch as the use of three elements as shown causes a preferable uniform heating of the individual sheets 36. Such uniform heating is considered desirable in facilitating the subsequent forming of these sheets 36 in the forming means 20. When only two of these heating elements are employed they are utilized so that the surfaces of the sheets 36 remote from one another are heated.

The heating elements 42 may be operated at a variety of different temperatures depending upon the nature of the specific material or materials used in the sheets 36. In general, these elements should be set so as to heat the adjacent surfaces of these sheets 36 to temperatures of within the range of from about 150° F. to about 350° F. depending upon specific material, or materials being processed. The purpose of the use of the surface heating means 16 herein described is to soften or make flexible the individual sheets 36 so that they may be easily formed through the use of the forming means 20 employed with this invention. However, these heating elements 42 should be maintained at a sufficiently low temperature so that no material or significant distortion of the sheets 36 as by sagging or the like takes place prior to the use of the forming means 20. In general, these elements 42 are operated at temperatures comparable to those employed in vacuum forming operations.

As the sheets 36 pass from the heating elements 42 they may be held apart by means of separating rods 44 which are attached to the wall 12 so as to extend therefrom. The label applying means 18 are located adjacent to the surfaces of the sheets 36 remote from one another between these separating rods 44. In general, any convenient conventional apparatus may be used in order to apply labels to the adjacent surfaces of the sheets 36 opposite these means 18. Thus, equipment of the general category used in the printing industry or the like may be employed for this purpose.

It is also possible to utilize for each of the label applying means 18 a cylindrical housing 46 which holds a solenoid coil 48 which in turn is traversed by a movable plunger 50 having a flanged end 52 formed thereon to support a stack 54 of labels. These labels may be conveniently manufactured in accordance with known techniques so as to have heat sensitive adhesive surfaces (not shown) holding individual labels 55 within these stacks with respect to one another. With this type of construction when the coils 48 are actuated the plungers 50 are moved so as to apply the stacks 54 against the adjacent surfaces of the sheets 36. As this occurs the heat sensitive adhesive on the terminal labels 55 within these stacks will, because of the heated character of the surfaces of the sheets 36, bond to these sheets a sufficient extent so as to remove these terminal labels 55 from these individual stacks. When the coils 48 are de-energized springs 56 within the housings 46 will pull the plungers 50 and the attached stacks 54 away from the sheets 36 a short distance. It is to be emphasized, however, that various other equivalent means may be employed for the purpose of applying labels.

After the separated sheets 36 pass over the rods 44 they are brought together within the forming means 20. These forming means are considered to be critical and important with the present invention. In the apparatus 10 the forming means 20 includes dies 58, the structures of which are best seen in FIGS. 3 through 5 of the drawings. Each of these dies 58 in the embodiment of the invention shown is shaped so as to manufacture phonograph records from the sheets 36. Each of the dies 58 includes a center portion 60 surrounded by a hub-like portion 62, a body portion 64 and a terminal portion 66. These portions are concentrically located with respect to one another in the shape desired for the surface of a phonograph record. Such a record is partially created when these dies 58 are brought together to a closed forming position as hereinafter described.

The terminal portions 66 are, with the construction shown, spaced so as to be adapted to be close to one another when the dies 58 are "closed" while the body portions 64 are formed so as to be spaced slightly further apart to a distance corresponding to the thickness desired in the portion of a phonograph record containing grooves when the dies 58 are in such position, while the hub-like portions 62 are spaced further apart when the dies are brought together to a closed position, and the center portions 60 are located so as to be spaced apart to a distance corresponding approximately to the spacing apart of the body portions 64 when these two dies are "closed." With this construction when the two dies 58 are brought together to a closed position the distance between the aligned hub-like portions 62 is slightly greater than the combined thickness of the two individual sheets 36, while the center and body portions 60 and 64 are spaced from each other a distance slightly less than the thickness of two of the sheets 36.

One of the dies 58 is mounted upon a fixed platen 68 which is, in turn, held upon a bracket 70 secured directly to the wall 12. The other of the dies 58 is mounted upon a movable platen 72 which is carried by a hydraulic ram 74 extending from a hydraulic cylinder 76 which in turn is located within another bracket 78. This bracket 78 is directly secured to the wall 12 as shown. With this construction when the hydraulic pressure is applied to the interior of the cylinder 76 through the hose 80 the dies 58 are brought together to a closed position as indicated in FIG. 5 of the drawings so that the various spatial relationships as described between these dies are created. Both of the platens 68 and 72 are preferably of a known electrically heated variety, and are thermostatically controlled so as to maintain a uniform temperature.

These platens 68 preferably include interior passages 82 connected to vacuum hoses 84. These passages are, in turn, in communication with interior cavities 86 formed in the individual dies 58. From the cavities 86 a plurality of small holes 88 (which are shown of an exaggerated dimension in the drawings for purposes of illustration) lead to approximately the midpoints of the hub-like portions 62 of these dies 58 located between the center portions 60 and the body portions 64. Further, these holes 88 are preferably spaced equidistant from one another around the center portions 60.

This type of construction is designed so that sheets 36 may be conveyed to between the dies 58 in the forming means 20 in a softened condition. Within the forming means 20 as the dies 58 are brought toward one another to a closed position these sheets are heated to a sufficient extent so that as the dies 58 reach a closed position the sheets 36 are formed by contact with these dies 58 to a desired shape. As this is being carried out the areas of the sheets 36 adjacent to the hub-like portions 62 of the dies 58 are pulled apart from one another against the portions 62 through vacuums applied through the hoses 84.

In order to secure accurate forming when dies 58 are brought to a closed position it is normally preferred to control these dies at a temperature of from about 150° F. to about 350° F. through the use of the thermostatically controlled platens 68 and 72. The precise temperature required for any material used in such sheets 36, will, of course, depend upon the nature of this material. In general, if temperatures too low are used with phonograph records, the material will not "flow" so as to adequately fill the grooves in the body portions 64 of the dies 58. If, however, temperatures which are too high are used these same grooves will tend to distort to an undesired extent so as to preclude adequate reproduction. As a general rule pressures between the dies 58 during such a forming region are within the range of from about 8000 to about 15,000 p.s.i. The pressures required will, of course, depend upon the temperatures employed as well as upon the nature of the material or materials used in the sheets 36. As the dies 58 are brought together under conditions as herein indicated the individual sheets 36 will, in effect, be laminated together in every area where they are contacted by these dies except at the hub-like portions 62. Thus some lamination will occur around the periphery of a record being "formed" in the manner herein described and the sheets 36 will be partially laminated together around such an article. A forming operation as herein described may also be utilized with only a single sheet of adequate thickness, instead of with two sheets such as the sheets 36, so as to create articles such as records. Such a single sheet may, of course, be carried through all the various process steps herein described.

As a general rule relatively high vacuums, such as vacuums in the order of 27–28 inches of mercury are required in order to "pull" the sheets 36 apart against the hub-like portions 62. During the use of vacuums as herein described the individual labels 55 located upon the sheets 36 are located within the hub-like portions 62 and tend to aid in holding the sheets 36 from being drawn into even the relatively small holes 88 in such a manner as to break up a desired smooth surface on articles formed.

From the forming means 20 the individual sheets which have been at least in part laminated together in this manner are moved to the cutting means 22. These cutting means preferably include coacting cutting dies 90, the lowermost of which is rigidly mounted upon a bracket 92 secured directly to the wall 12 and the uppermost of which is movably mounted upon a ram 94 attached to a hydraulic cylinder 96 located within another bracket 98 attached to the wall 12. These dies 90 when brought together through the operation of the cylinder 96 serve to cut from the sheets 36 a complete record created by the forming means 20 previously described. The lowermost of the cutting dies 90 is formed with a generally central aperture 100 through which portions (not shown) of the laminated sheets 36 which have been cut out of the center of a record fall into a scrap material collecting bin 102 attached to the wall 12. A record so cut is conveyed by virtue of contact with the uncut portions of the sheets 36 along a platform 104 so as to move over a hole 106. When a record is located directly above this hole it falls through such hole 106 onto a spindle 108 mounted upon a carriage 110 which in turn is rotatably mounted upon the wall 12 at a direction at right angles to the planes of the sheets 36. With this construction the carriage 110 may be rotated so as to move another spindle 112 under the hole 106 when the first spindle 108 has become loaded with a stack of records 114. After individual records have been removed in this manner the sheets 36 travel further along the platform 104 so as to pass beneath control means 116 which govern the operation of power means 28. Preferably these control means 116 consist of a photoelectric cell 118 which receives power from a light source 120 mounted on the platform 104, although other equivalent means, such as micro-switches and the like, can be used. With this construction the control means 26 are directly connected to an electric motor 122 serving as the power means 28. Preferably this motor 122 is of a variable speed category and is constructed in such a manner as to provide a stepping type of action. This motor 122 is connected to a shaft 124 through a conventional coupling 126 and the shaft 124 is rotatably supported on brackets 128 extending upwardly from a terminus of the wall 12. With this construction the shaft 124 is removably held. Further, it serves as a means for forming rolls inasmuch as at the start of the use of the apparatus 10 extremities of the sheets 36 may be attached to it by conventional means and as the complete apparatus 10 is operated a scrap roll is created from the material remaining after articles have been formed as indicated in the preceding discussion.

With this construction the various means 14 through 24 are designed so that the power means 28 may be operated in a sequential stepwise manner in order to periodically take given lengths of the sheets 36 from the rolls 34 and then stop any motion of these sheets. Further, the various means 14 through 26 are located with respect to each other with such correct spacing so that as the apparatus herein described is operated a plurality of records are created one immediately adjacent to the next, and so that each time the sheets 36 are in an "at rest" position the label applying means 16, the forming means 20, the cutting means 22, the collecting means 24 are utilized. The passage of the sheets 36 through the apparatus 10 of course define, in effect, a work path for said sheets 36. The speed of these operations is, of course, governed through the use of the control means 26. These control means 26 are connected by means of wires to a program control unit 130 of a known type which is, in turn, connected to the coils 48 and to the hydraulic cylinders 76 and 96 so as to govern the operation of these various parts. Program control means 130 also includes as an integral part of this unit means for supplying hydraulic fluid under pressure (not shown) and means for pumping vacuum (not shown).

From a detailed consideration of the preceding description it will be realized that the apparatus 10 may be used in creating a number of different types of articles in addition to phonograph records. It will also be realized that in carrying out the procedure indicated in the preceding discussion describing the operation of the apparatus 10 that articles such as records may be easily and conveniently created at a comparatively rapid speed. Because of these factors it is considered that the present invention has comparatively wide utility. The method and apparatus herein described are considered to be capable of being used so as to produce articles such as records at a much lower labor cost than such articles can be produced in accordance with established practices. Since labor is a major factor in the cost of such articles, it is contemplated that the present invention will have wide commercial acceptability and application.

Because of the nature of this invention it is to be considered as being limited only by the appended claims forming a part of this disclosure.

I claim:

1. In an apparatus for forming phonograph records from two sheets of thermoplastic material which includes: two opposed, aligned dies, and means for moving said dies to a closed position in which said dies are spaced from one another, said dies having opposed center portions surrounded by opposed hub-like portions and opposed body portions surrounding said hub-like portions, said portions being concentrically located on said dies in positions corresponding to surfaces of a phonograph record, a plurality of holes spaced from one another located within each of said dies so as to lead from said hub-like portions, said holes being adapted to be used in conveying air from the opposed surfaces of said hub-like portions during the utilization of said dies, said dies in said closed position being located so that said opposed body portions are spaced from one another a distance less than the thickness of the two sheets of thermoplastic material used with said dies, said hub-like portions being spaced from one another in said closed position a distance greater than the combined thickness of said two sheets.

2. In an apparatus for forming phonograph records from two sheets of thermoplastic material which includes: two opposed, aligned dies, and means for moving said dies to a closed position in which said dies are spaced from one another, said dies having opposed center portions surrounded by opposed hub-like portions and opposed body portions surrounding said hub-like portions, and terminal portions surrounding said body portions, said portions being concentrically located on said dies in positions corresponding to surfaces of a phonograph record, a plurality of holes spaced from one another located within each of said dies so as to lead from said hub-like portions, said holes being adapted to be used in conveying air from the opposed surfaces of said hub-like portions during the utilization of said dies, said dies in said closed position being located so that said opposed body portions are spaced from one another a distance less than the thickness of the two sheets of thermoplastic material used with said dies, said hub-like portions being spaced from one another in said closed position a distance greater than the combined thickness of said two sheets, said terminal portions being located closer to one another in said closed position than said body portions.

References Cited in the file of this patent
UNITED STATES PATENTS

| | | |
|---|---|---|
| 1,324,850 | Roberts | Dec. 16, 1919 |
| 2,695,423 | Pardee et al. | Nov. 30, 1954 |
| 2,797,439 | Borkland | July 2, 1957 |
| 2,839,306 | Bayless | June 17, 1958 |
| 2,902,718 | Martelli et al. | Sept. 8, 1959 |
| 2,916,771 | Lang et al. | Dec. 15, 1959 |
| 2,924,852 | Michalko | Feb. 16, 1960 |
| 2,952,042 | Garsson | Sept. 13, 1960 |